Feb. 27, 1934.                J. R. GRUNDY                1,948,708
                             FLEXIBLE COUPLING
                            Filed March 9, 1933
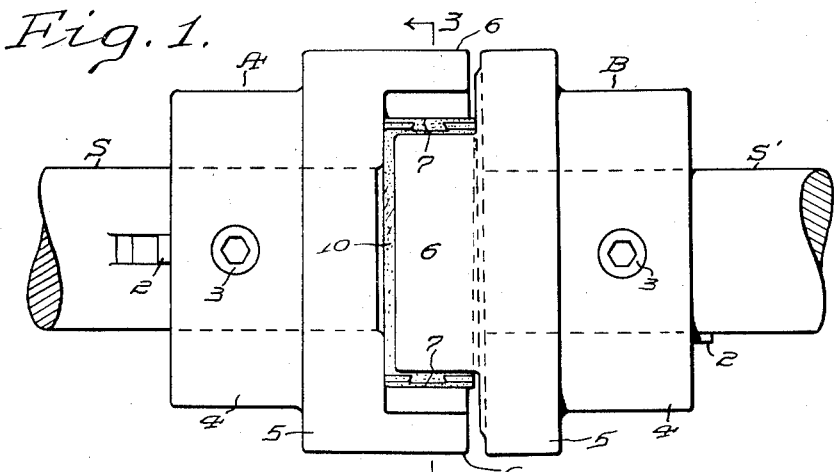
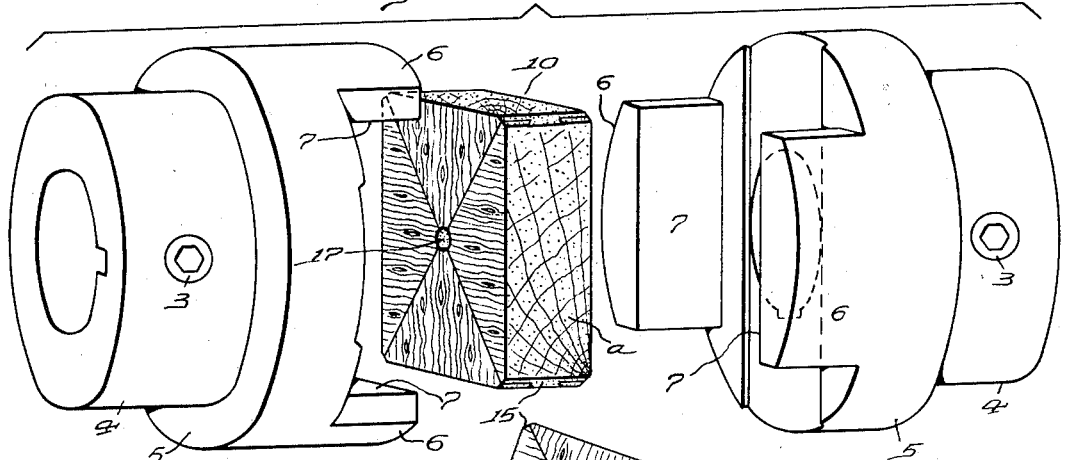
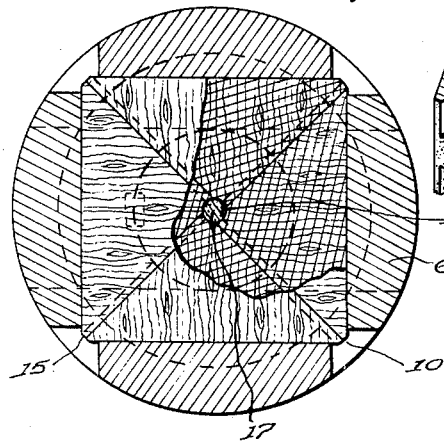
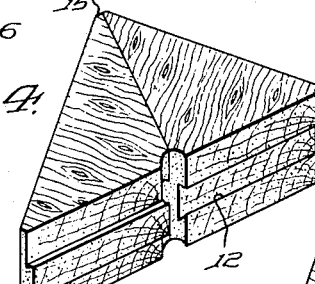
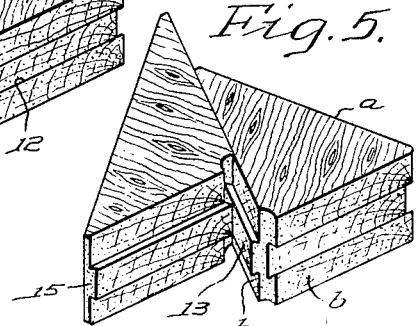
INVENTOR
John. R. Grundy Patented Feb. 27, 1934

1,948,708

UNITED STATES PATENT OFFICE 1,948,708

FLEXIBLE COUPLING

John R. Grundy, Philadelphia, Pa.

Application March 9, 1933. Serial No. 660,132

12 Claims. (Cl. 64—96)

The present invention relates to flexible couplings for transmitting power between a driving shaft and a driven shaft irrespective of whether the shafts are in exact alignment or in slightly angular relation.

One type of flexible coupling which has heretofore frequently been utilized for this purpose comprises complementary, substantially similar metal yokes respectively provided with oppositely disposed interfitting bosses embracing a substantially square floating center member or block. Thus, United States Patent 1,612,399, December 28, 1926, to George H. Thomas, discloses a coupling of this type having a floating member formed of metal provided with friction plates secured to its sides for engagement by the bosses on the yokes and hollowed to form an oil reservoir from which oil is fed to the surfaces of the plates. Blocks integrally molded or compressed from non-metallic material and likewise provided with internal oil reservoirs from which oil is fed to their bearing faces have also been employed.

Such substantially rigid floating members, be they made of metal faced with friction material, or entirely of non-metallic material, are not wholly satisfactory, for under normal conditions of use engagement between the wearing faces of the block and the bosses on the yokes takes place only adjacent diagonally opposed corners of the blocks so that the wear on the latter is localized instead of being distributed over the entire area designed therefor, with the result that the block wears much more rapidly and becomes unserviceable in a correspondingly shorter time than would otherwise be the case. Moreover, effective lubrication of the wearing surfaces over extended periods cannot be maintained, for under practical operative conditions, particularly at the higher speeds, the oil from the chamber in the block is rapidly exhausted so that in a comparatively short time the wearing surfaces run dry or substantially so, necessitating prompt replenishment of the oil supply, with consequent stoppage of the shafts while the oil filler plugs are removed, oil injected, and the plugs replaced, if excessive and rapid wear is to be avoided. Additionally, the oil works out between the bearing surfaces and is thrown radially from the coupling by centrifugal force to the detriment of objects in the vicinity of the coupling.

A principal object of my invention, therefore, is to provide a flexible shaft coupling embodying an improved floating block so arranged as to afford maximum effective area of contact with the bosses of the coupling yokes so that the friction per unit of area between the parts is correspondingly reduced and localized wear avoided.

A further object of the invention is to provide a floating block for a coupling of this type composed of relatively movable segments so arranged that the position of their wearing faces with respect to the bosses on the coupling yokes is automatically adjusted in response to the stresses exerted upon the block.

Another object is to provide a flexible coupling comprising a floating block formed of wood or other material having a directionally defined grain structure, the block being so constructed and arranged that each of its peripheral wearing faces is disposed substantially normal to the grain of the material and thus presents an end-grain surface for the reception of the stresses exerted thereon when the block is in use.

A still further object is the provision of a flexible coupling comprising a floating block which is of highly wear resisting character, which does not require lubrication substantially throughout its operative life and which provides surfaces offering but a minimum of friction between the respective parts whereby the power losses in the coupling when the shafts are slightly out of alignment are reduced to a substantially negligible minimum and are eliminated entirely when the shafts are in perfect alignment, the necessity for periodically replenishing the supply of lubricant within the block is obviated, and the soiling of articles in the vicinity of the coupling by lubricant thrown out therefrom is avoided.

Other purposes, objects and advantages of the invention will hereinafter more fully appear or be understood from the following description of one form of coupling constructed in accordance therewith as illustrated in the accompanying drawing.

In the said drawing, Fig. 1 is a side elevation of the coupling in operative assembly with driving and driven shafts; Fig. 2 is a composite, perspective view of the coupling axially separated for clearness of illustration; Fig. 3 is a vertical section on the line 3—3 in Fig. 1, the floating block being shown partially in elevation, and Figs. 4 and 5 are perspective views of segments of the floating block showing their construction as well as their relationship during assembly and before being positioned in the coupling. In the several figures like characters are used to designate the same parts.

Referring now more particularly to the drawing it will be understood that the driving shaft S and driven shaft S' are indicated merely as typical elements in association with which the flexible coupling of my invention may be employed; these shafts are shown in slightly angular relation since couplings of the character of those to which my invention relates are frequently used and are designed to operate satisfactorily under such conditions as well as when the shafts are exactly axially aligned. The shafts S, S' support adjacent their respective ends identical coupling yokes A, B, secured thereto by means of keys 2 and set screws 3, which retain them in nonrotatable relation with their respective shafts in accordance with common practice. Each yoke comprises a collar 4 and, integral therewith, a circular flange 5 having parallel outwardly projecting bosses 6, the respective inner faces 7 of which afford bearing surfaces for engagement with the floating block when the coupling is assembled. The bosses 6 of the yoke A have their bearing surfaces 7 disposed at right angles to the corresponding bearing surfaces on the opposite yoke B so that the four bearing surfaces thus in effect substantially enclose a square area within which the floating block 10 is loosely yet snugly received, the distance between opposite peripheral faces of the block as a whole being slightly less than the distance between the respective bearing surfaces on the yokes.

The floating block 10, as has been indicated, is a composite member constructed of four identical segments made of a suitable material, preferably one having a directionally defined grain, such as maple wood, each segment being so arranged that its outer face, forming a peripheral face of the block, extends substantially normal to the grain of the material. In shape each segment approximates an isosceles right triangle, its base $a$ forming one peripheral surface of the assembled block, and its angular sides $b$—$b$ being respectively provided with a mortise 12 and tenon 13 which permits dove-tailing of the several segments, as best shown in Figs. 3 to 5, to form the block as a whole. The outer corners of the segments are preferably beveled as at 15 while the apex of the central angle is cut out in a curve so that a circular aperature 16 is formed at the center of the block when four of the segments are assembled in operative relationship. This aperture provides a slight clearance for movement of the several segments when sliding with respect to each other longitudinally of their dove-tail joints and may, if desired, be fitted with a yielding plug 17 of cork, rubber or the like which prevents the several segments from becoming separated when not disposed in the coupling although permitting relative movement therebetween to the slight extent demanded by the coupling when in operation. Ordinarily the plug is left in place when the block is assembled in the yokes for its presence is in no wise objectionable, its yielding character permitting the requisite relative sliding movement of the blocks upon each other, while it operates to hold the block segments together should the coupling at any time be taken apart. Primarily, however, the function of the plug is to prevent the segments from coming apart and perhaps being lost during shipment or storage.

The dovetailing of the joints between the respective segments also assists in preventing separation of the latter during shipment and in retaining them in proper relation while the coupling is in operation but under some conditions may be omitted so that the segments will interengage in plane surfaces if desired, although this construction is less convenient when the coupling is being assembled unless some other suitable means for holding the segments together is employed.

I prefer to thoroughly impregnate the segments of the block 10 with oil, paraffine or other suitable lubricant prior to their being assembled in the coupling, and I have found that by so doing satisfactory lubrication of the wearing faces is obtained throughout the life of the parts, thus doing away entirely with the necessity for periodic lubrication and avoiding contamination of adjacent objects by oil thrown from the coupling.

It will be understood that when the floating block is operatively disposed in the coupling, the outer surfaces $a$ of one pair of opposed segments respectively engage the inner bearing surfaces 7 of the bosses 6 on the yoke A and the remaining segments similarly engage corresponding surfaces of the yoke B. Thus when one shaft S is rotated, corresponding rotation of the other shaft S' is brought about through the floating block connection between the yokes, while the sliding of the segments upon themselves compensates for any disalignment of the parts or lack of exact normalcy between the bearing surfaces of the respective members and effectually maintains substantially the entire surface $a$ of each segment in intimate engagement with its corresponding bearing surface on the yoke so that wear on any localized areas is avoided.

It will be observed that all of the surfaces of the block which are subjected to wear when the coupling is in operation are disposed in angular relation to the grain of the material with the result that the wear thereon is reduced to a minimum and when the material is impregnated with a suitable lubricant is, in fact, substantially negligible over a protracted period of use.

While I have herein described my invention with considerable particularity and pointed out several distinctive features thereof, it will be understood I thereby do not desire or intend to limit or confine myself to the precise embodiment of the invention to which I have referred, to the use of a block constructed of any specific material, nor to any specific form or arrangement of any of the parts, as changes and modifications therein and/or in the mode of assembly thereof will readily occur to those skilled in the art and may be made if desired without departing from the spirit and scope of the invention as defined in the appended claims.

Having thus described my invention, I claim and desire to protect by Letters Patent of the United States:

1. A flexible coupling comprising substantially identical oppositely disposed yokes having interfitting bosses projecting respectively from each yoke toward the other, a floating block comprising complementary relatively movable segments interposed between said yokes within said bosses, and means operative to effect sliding interengagement of each segment with its next adjacent segment.

2. A flexible coupling comprising a pair of oppositely disposed yokes having interfitting bosses and a floating block interposed between the yokes within said bosses, said block comprising a plurality of segments of material having a directionally defined grain so arranged that said grain extends substantially normal to the surfaces of the segments respectively lying adjacent said bosses.

3. A flexible coupling comprising a pair of opposed yokes, and a polyhedral floating block interposed between said yokes comprising a composite wooden body in which the grain of the wood extends substantially parallel to two of the peripheral surfaces of the block and substantially normal to all of its other peripheral surfaces at said surfaces.

4. A flexible coupling comprising a pair of opposed yokes each having substantially parallel bearing surfaces and a floating block interposed between said yokes operative to inhibit relative rotation between said yokes on their respective axes, said block comprising a plurality of relatively movable polyhedral segments respectively adapted to engage said surfaces, and means for yieldingly maintaining said segments in sliding interengagement.

5. In a flexible coupling, opposed pairs of bosses each provided with a bearing surface, the bearing surfaces of each pair being disposed in substantially parallel relation and substantially normal to the corresponding surfaces of the other pair, and a floating block of material having a directionally defined grain disposed within the area defined by and adapted to engage said bearing surfaces, said grain extending substantially normal to said surfaces in the portions of the block respectively adjacent thereto.

6. In a flexible coupling, opposed pairs of bosses each provided with a bearing surface, the bearing surfaces of each pair being disposed substantially parallel to each other and substantially normal to the corresponding surfaces of the other pair, and a floating block comprising separable interfitting segments each adapted to engage one of said bearing surfaces.

7. A floating block for a flexible coupling comprising complementary segments of material having a directionally defined grain, each segment having its grain extending substantially normal to the grain in the adjacent segments.

8. A floating block for a flexible coupling comprising complementary wooden segments, each segment having its grain extending substantially normal to the grain in the adjacent segments.

9. A floating block for a flexible coupling comprising complementary sections having interfitting joints and relatively movable with respect to each other, each segment presenting a bearing surface extending substantially normal to the corresponding bearing surfaces of adjacent segments.

10. A floating block for a flexible coupling comprising complementary sections having interfitting joints and relatively movable with respect to each other, each segment presenting a bearing surface extending substantially normal to the corresponding bearing surfaces of adjacent segments, and means operative to maintain said segments in assembled relation.

11. In a flexible coupling, a floating polyhedral block comprising a plurality of complementary segments having interfitting joints operative to maintain each segment in slidable relation with its adjacent segments, and members disposed on opposite sides of the block having opposed bearing surfaces respectively adapted to engage a portion of its periphery.

12. In a flexible coupling, a floating block comprising a plurality of complementary segments formed of material having a directionally defined grain and provided with interfitting joints adapted to maintain the segments in relatively movable assembled relation, each segment having a bearing surface extending substantially normal to said grain and to the corresponding surface of adjacent segments in the block, and opposed coupling yokes each provided with a pair of substantially parallel bearing surfaces respectively adapted to engage the bearing surfaces of said segments.

JOHN R. GRUNDY.